United States Patent [19]
Gaultier

[11] Patent Number: 5,945,474
[45] Date of Patent: Aug. 31, 1999

[54] COMPOSITION AND METHOD FOR REMOVING A SUBSTANCE FROM A FINISHED SURFACE

[76] Inventor: Serge Gaultier, 8 Rue Nicolas Appert, Z.I. n°2 , 37303, Joué Les Tours, France

[21] Appl. No.: 08/944,477

[22] Filed: Oct. 6, 1997

[51] Int. Cl.$^6$ .............................. C09G 1/02; C08L 27/12
[52] U.S. Cl. ......................... 524/546; 524/437; 524/450; 106/5; 106/8; 510/242; 510/507
[58] Field of Search ..................................... 524/437, 450, 524/546; 106/5, 8, 11; 510/242, 507

[56] References Cited

U.S. PATENT DOCUMENTS

| | | |
|---|---|---|
| 3,869,834 | 3/1975 | Mullin et al. . |
| 3,966,432 | 6/1976 | Rayner ..................................... 510/507 |
| 4,013,475 | 3/1977 | Liebowitz et al. ........................ 106/10 |
| 4,055,433 | 10/1977 | Morones . |
| 4,398,953 | 8/1983 | van der Linde . |
| 4,460,489 | 7/1984 | Kendall . |
| 4,512,677 | 4/1985 | Trinh . |
| 4,592,934 | 6/1986 | Wolstoncroft . |
| 4,785,067 | 11/1988 | Brumbill . |
| 4,808,329 | 2/1989 | Soldanski et al. . |
| 4,952,240 | 8/1990 | Smith . |
| 4,952,248 | 8/1990 | Aberg . |
| 5,017,222 | 5/1991 | Cifuentes et al. . |
| 5,094,687 | 3/1992 | Elepano . |
| 5,154,759 | 10/1992 | Cifuentes et al. . |
| 5,266,088 | 11/1993 | Sandusky et al. . |
| 5,294,248 | 3/1994 | Chittofrati et al. . |
| 5,326,381 | 7/1994 | Wu . |
| 5,391,210 | 2/1995 | Bilkadi et al. . |
| 5,397,384 | 3/1995 | Wisniewski . |
| 5,551,962 | 9/1996 | Ho . |
| 5,697,991 | 12/1997 | Frazer . |
| 5,700,312 | 12/1997 | Fausnight et al. . |

*Primary Examiner*—Andrew E. C. Merriam

[57] ABSTRACT

A composition for removing a substance from a surface is prepared by: forming a gelatinous base material comprising water and a rheology agent; forming a solvent; forming a neutralizing agent; combining the gelatinous base material and the solvent with microscopic crystalline particles and an agent which reduces the effective rubbing coefficient of the microscopic crystalline particles to form a non-neutralized composition; and combining the non-neutralized composition with the neutralizing agent to form the composition. Foreign substances can be removed from a finished surface and the visibility of superficial scratches in the finished surface can be reduced by gently rubbing the composition on the finished surface and then removing the composition. The composition includes microscopic (approximately 1 micron) crystalline particles which contact, dislodge and remove the foreign substance or minute portions of the finish. The composition includes PTFE powder and a gelatinous base material including a rheology agent, both of which act to control the rubbing coefficient of the microscopic particles, such that the desired substance removal is effected without destructive removal of the finish (e.g., scratching).

4 Claims, No Drawings

COMPOSITION AND METHOD FOR REMOVING A SUBSTANCE FROM A FINISHED SURFACE

BACKGROUND OF THE INVENTION

1. Field of the Invention

The present invention relates to a composition for restoring the appearance of marred finished surfaces and to a method for removing a substance from a marred finished surface and to a method for forming the composition. In particular, the present invention relates to a composition and method for reducing the visibility of scratches in finished surfaces, such as enamel-coated painted surfaces, polyester and polycarbonate surfaces, enamel and varnish finishes, formica, and laminated wood.

2. Description of the Related Art

Many consumer products have finishes that are susceptible to damage such as scratches and stains. For example, the enamel finish on an automobile can be easily scratched or scuffed from light contact with objects such as keys, rings, branches, nails and other automobiles. Similarly, the glossy finish on varnished wood, laminated wood and plastic surfaces tends to become scratched and dull over time due to normal wear and tear.

Typically, some type of polishing compound is applied to these finishes in order to restore a smooth appearance. However, conventional polishing compounds contain highly abrasives substances which, in the process of reducing the visibility of an existing scratch, tend to further scratch and damage the finish. In the case of an enamel-coated, painted surface, such as the finish of an automobile, application of a conventional polishing compound may wear away the protective enamel and permanently damage the underlying paint.

SUMMARY OF THE INVENTION

Accordingly, it is an object of the present invention to provide a composition and method for treating surface scratches on a finished surface without causing unnecessary secondary scratches or damage to the finish.

It is another object of the present invention to provide a composition and method for removing tarnish from metal objects.

According to the present invention, the visibility of surface scratches in a finished surface is reduced by applying a composition which removes foreign substances and smooths the edges of superficial surface scratches. Specifically, the composition of the present invention includes minute particles that gently dislodge foreign substances deposited on a finished surface without significantly damaging the finished surface itself, in a manner analogous to erasing a pencil mark from a piece of paper. When a superficial scratch has been formed in the finish itself, application of the composition tends to smooth the sharp edges of the scratch by removing small amounts of the adjacent finish without excessive scratching or damage to the finish. The smoothing of the edges of the scratch tends to reduce the visibility of the scratch, and subsequent waxing of the finished surface restores a glossy appearance. The composition is preferably in the form of a creamy paste which is gently rubbed on the damaged finish for a short period of time and then removed.

The composition is also useful for removing tarnish from ferrous and non-ferrous metal articles, such as silverware, chrome or rusty metal.

These and other objects and features of the present invention will become more apparent upon consideration of the following detailed description of a specific embodiment thereof.

DESCRIPTION OF THE PREFERRED EMBODIMENT

To further illustrate the advantages of the present invention, an example will be given of the invention in its preferred embodiment.

The principal advantages of the present invention are that the composition and method for applying the composition will remove foreign substances from a finished surface and reduce the visibility of a superficial scratch formed in a smooth finish without unnecessarily scratching the finish or excessively removing the finish.

The composition of the present invention includes a gelatinous based material mixed with a solvent, a neutralizing agent, microscopic crystalline particles and a polytetrafluoroethylene (PTFE) powder or the like. The microscopic crystalline particles serve as an ultra-fine rubbing agent and are on the order of 5 microns in diameter or smaller, preferably no more than approximately 1 micron in diameter. The microscopic particles can be, for example, very fine alumina or other inorganic oxides including metallic oxides. Through contact with the particles, the composition gently dislodges foreign substances deposited on a finished surface without significantly damaging the finished surface itself. It has been found that when the gelatinous base material is formed from a rheology agent, such as magnesium aluminum silicate, the rubbing action of the microscopic particles is controlled to a level where constructive removal of material is achieved without causing excessive or destructive removal of material (e.g., scratching).

The PTFE powder component of the composition also serves to reduce the effective rubbing coefficient of the microscopic particles to an acceptable level and leaves a light residue which protects the area to which the composition has been applied. The PTFE powder preferably comprises particles of different size with, for example, 90% of the particles having a diameter less than 6 microns and 10% of the particles having a diameter less than 1 micron. Thus, the rheology agent and the PTFE ensure that the rubbing action of the microscopic particles of the composition is maintained at an appropriate level. The rubbing action of the composition is analogous to that of an eraser that removes pencil marks from a piece of paper without significantly damaging the paper itself.

The composition also reduces the visibility of superficial scratches which are formed in a finished surface itself. In this case, the particles in the composition contact the finish in the vicinity of the scratch and remove minute amounts of the finish along the sharp edge of the scratch in order to smooth the surface of the finish. Due to the above-mentioned components and properties of the composition, this smoothing can be accomplished without significantly damaging the finish through scratching and unnecessary removal of the finish. That is, while some finish is removed to improve the appearance of the scratch, the composition does not tend to cause visible secondary scratches or to remove an excessive amount of finish. Again, this is due to the rubbing coefficient of the microscopic particles being controlled to an acceptable level by the rheology agent within the gelatinous based material and by the PTFE component.

The action of the composition also works to remove tarnish and rust from non-ferrous and ferrous objects. The microscopic particles within the composition contact and dislodge the oxidized material on the surface of the metal without significantly impacting the underlying metal itself.

Although it is not intended that the scope of the present invention be limited thereby, the following example will specifically point out how the preferred embodiment of the invention may be produced. The ingredients of the composition and their proportion of the final composition in weight and volume is given in Table 1.

TABLE 1

| Ingredients: | % Per Weight | % Per Volume |
| --- | --- | --- |
| Mineral Spirits (182–215° C.) | 19.7% | 15.27% |
| Triethanolamine | 5.8% | 4.5% |
| Dimethyl Silicone (1000 ctk) | 0.5% | 0.39% |
| Oleic Acid | 7.9% | 6.12% |
| Sorbitan Sesquioleate | 1.2% | 0.93% |
| Water | 26.385% | 20.45% |
| Magnesium Aluminum Silicate | 0.415% | 0.32% |
| Alumina | 37.0% | 28.68% |
| Powders of Polytetrafluoroethylene (PTFE) | 1.0% | 0.78% |
| Aqua Ammonia | 0.1% | 0.08% |

Using the components shown in Table 1, the composition is preferably manufactured using the following steps.

Step 1:

A magnesium aluminum silicate gel is formed from 5% magnesium aluminum silicate and 95% water (by weight). For example, to form a 200 kg lot of the gel, in a 300 liter stainless steel tank, 190 liters of water at 80° C. is mixed with 10 kg of magnesium aluminum silicate. The water and magnesium aluminum silicate are mixed with a blade designed to increase emulsification. Specifically, holes are formed in the blade which increase the emulsification action. The blade preferably rotates at high speed, e.g., 2000 rotations per minute. The mixture is thereby homogenized and then left to swell for two hours.

Step 2:

A solvent mixture is formed by combining the mineral spirits, oleic acid, sorbitan sesquioleate and dimethyl silicone in the proportions shown in Table 1. For example, to form a lot of 2,000 liters of solvent, in a 2,500 liter stainless steel tank, at room temperature, the oleic acid, the sorbitan sesquioleate and finally the dimethyl silicone are added to the mineral spirit by slowly stirring. The components are homogenize for 40 minutes.

Step 3:

A lot of 200 liters of neutralizing agent is formed in the following manner. At room temperature, in a 300 liter stainless steel drum, the triethanolamine and the aqua ammonia are combined with approximately 15% to 20% of the total water with moderate mixing (i.e., 3 to 4 parts water to 4.5 parts triethanolamine to 0.08 parts aqua ammonia by weight). The components are homogenized in an enclosed tank for 20 minutes.

Step 4:

A lot of 500 kg of the non-neutralized product is formed at room temperature in the following manner. In a 600 liter stainless steel tank, using the special emulsifying blade described in Step 1, the proper proportion (see Table 1) of solvent mixture is combined with the magnesium-aluminum-silicate gel at a high speed (e.g., 2000 rpm) and homogenized for 10 minutes. The remaining water (approximately 200 liters) is then added and the components are homogenized for 10 minutes. Finally, the alumina and PTFE powder are added, and the composition is homogenized for 1 hour.

Step 5:

A lot of 250 kg of the finished product is formed at room temperature in the following manner. The proper proportions of the non-neutralized product (Step 4) and the neutralizing agent (Step 3) are combined in a mixer, preferably stirred with Z-shaped arms, and homogenized for 1 hour in order to neutralize the composition.

The specific components used in the above example have been demonstrated to exhibit a superior capability, relative to known compositions, to remove foreign substances and smooth superficial surface scratches without damaging the finish. However, the present invention is not limited to these specific components, and other substances can be substituted for these components within the scope of the invention.

Specifically, as mentioned above, other rheology agents, including but not limited to pyrogen and microbially synthesized polysaccharides such as xanthan gum can be used in the gelatinous base material. The mineral spirit may be an organic based solvent, such as an aliphatic solvent, an isoparaffinic solvent or a linear paraffinic solvent. The triethanolamine may be replaced by other dispersing agents such as organic or mineral bases, such as morpholin, 2-amino-2-methyl-1-propanol (AMP), diethanolamine, ammonia, etc. or sodium or potassium hydroxide. The oleic acid may be replaced by a different $C_8$–$C_{30}$ fatty acid, such as stearic, palmitic or lauric acids. Dimethyl silicone can be replaced by a different chemical brilliance agent, preferably other siloxane derivatives. Silica, aluminum silicate or other metallic silicates or oxides can be used in place of alumina. Appropriate lubricating waxes and thermoplastic resins can be substituted for PTFE powder. Finally, other, non-ionic, emulsifiers known in the art may be used in place of sorbitan sesquioleate.

The composition that results from the above process is a creamy white paste which can be stored and dispensed from a plastic tube or the like. The composition does not add any paint or color to a finished surface. However, it should be noted that many consumer products that are painted, including appliances and automobiles, have a clear enamel coating over the pigmented paint. Thus, the composition is effective in removing superficial scratches formed in the enamel of such painted products.

To remove foreign substances and to reduce the visibility of scratches in the finished surface, the composition is gently rubbed on the finished surface for a short period of time with, for example, a dry cotton cloth. The composition is then wiped off, leaving only a slight residue containing the PTFE which helps to protect the treated area. To fully restore a shiny or glossy appearance, a wax may subsequently be applied, if appropriate.

The composition can be used to improve the appearance of a variety of surfaces, including but not limited to: enamel-coated, painted surfaces; polyester and polycarbonate surfaces; enamel and varnish finishes; formica; and laminated wood. In addition, the composition restores ferrous and non-ferrous metals, and precious metals by removing oxidants. Further, the composition removes rust on chrome, provided the chrome is not corroded.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. A composition for removing a substance from a surface comprising:

a gelatinous base material comprising water and magnesium aluminum silicate;

a solvent mixture comprising mineral spirits, dimethyl silicone, oleic acid and sorbitan sesquioleate;

microscopic alumina particles;

PTFE powder; and a neutralizing agent comprising triethanolamine and aqua ammonia.

2. The composition according to claim 1, wherein a diameter of the alumina particles is less than 5 microns.

3. The composition according to claim 1, wherein a diameter of the alumina particles is less than 1 micron.

4. The composition according to claim 1, wherein the PTFE powder includes particles having a diameter between 1 and 6 microns.

* * * * *